(12) United States Patent
Sturt et al.

(10) Patent No.: US 7,114,755 B1
(45) Date of Patent: Oct. 3, 2006

(54) AUTOMOTIVE CONSOLE HAVING A DOUBLE HINGED LID

(75) Inventors: Alan Sturt, West Bloomfield, MI (US); James A Mulvihill, Berkley, MI (US); James Hutek, St. Clair Shores, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/908,616

(22) Filed: May 19, 2005

(51) Int. Cl.
*B60R 7/04* (2006.01)

(52) U.S. Cl. .................................. 296/24.34

(58) Field of Classification Search ............ 296/24.34, 296/37.1, 37.8, 37.14; 224/400, 539, 542, 224/275, 484, 485, 545, 548, 553, 926, 929, 224/933
See application file for complete search history.

(56) References Cited

U.S. PATENT DOCUMENTS

| | | | |
|---|---|---|---|
| 5,562,331 A * | 10/1996 | Spykerman et al. | ... 297/188.16 |
| 5,809,897 A * | 9/1998 | Powell et al. | ................ 104/282 |
| 6,003,716 A | 12/1999 | Allison et al. | .............. 220/326 |
| 6,663,155 B1 * | 12/2003 | Malone et al. | ............. 296/37.8 |
| 6,719,343 B1 | 4/2004 | Emerling et al. | .......... 296/24.1 |
| 6,746,065 B1 * | 6/2004 | Chan | ........................ 296/24.34 |
| 6,761,388 B1 | 7/2004 | Lein et al. | ............... 296/24.34 |
| 6,890,012 B1 * | 5/2005 | Maierholzner | ........... 296/24.34 |
| 6,929,304 B1 * | 8/2005 | Dry et al. | ................... 296/37.8 |
| 2002/0140632 A1 | 10/2002 | Shah | ............................. 345/5 |
| 2002/0163215 A1 * | 11/2002 | Emerling et al. | .......... 296/24.1 |
| 2003/0155787 A1 * | 8/2003 | Lein et al. | .................. 296/24.1 |
| 2004/0189797 A1 | 9/2004 | Todd et al. | .................... 348/61 |
| 2006/0071497 A1 * | 4/2006 | Radu et al. | .............. 296/24.34 |

* cited by examiner

*Primary Examiner*—H Gutman
(74) *Attorney, Agent, or Firm*—Wood, Herron & Evans, L.L.P.

(57) ABSTRACT

An automotive console includes a console body adapted to be installed in the passenger compartment of a vehicle and includes a storage compartment having an opening for storing one or more items. The console further includes a console lid having a first lid portion pivotally coupled with the console body and movable relative thereto between an open and closed position. The console lid further includes a second lid portion pivotally coupled with the first lid portion and movable relative to the first lid portion between a first position and a second position. The second lid portion includes at least one convenience feature adapted for use by a second row occupant when the first lid portion is in the open position and the second lid portion is in the second position.

20 Claims, 4 Drawing Sheets

AUTOMOTIVE CONSOLE HAVING A DOUBLE HINGED LID

FIELD OF THE INVENTION

The present invention pertains generally to a console for a motor vehicle, and more particularly to an automotive console having a double hinged lid.

BACKGROUND OF THE INVENTION

It is known to provide vehicle interiors with various trim assemblies to enhance the aesthetic appearance of the interior and to provide comfort, as well as convenience, to vehicle occupants. For example, many automotive vehicles include a center console or other storage device disposed between the driver and passenger seats in the front passenger compartment of the vehicle. These consoles typically comprise a console base either secured to the floor or pivotally connected between the seats, a storage cavity formed in the console base to retain items during travel and a generally rectangular lid pivotally connected to the console base extending generally horizontally across the storage cavity. The lid typically includes a padded upper portion covered with an aesthetically pleasing covering, such as vinyl or leather or other suitable materials that presents a "class A" surface. The lid is coupled with the console base so as to be moveable between an open and closed position, the contents of the storage cavity being accessible when in the open position.

The console has many functions. For instance, in addition to operating as a storage unit, the console may operate as an armrest or as a writing table or general work surface for an occupant of the front passenger compartment. Additionally, the console may include one or more cup holders, a coin compartment and other convenience features desired by vehicle occupants. More recently, the center console has been used to provide a viewing screen for onboard video entertainment systems such that the back seat occupants may view the screen.

While the convenience features incorporated into the consoles of many automobiles have been largely successful in meeting the desires and needs of the front passenger compartment occupants, providing many of these features to the second row occupants in the rear passenger compartment has proven more challenging. This is especially true, for example, for the middle seat occupant. Second row seating often is configured as a bench seat capable of seating multiple occupants. Typically, at least one end of the bench is adjacent a side of the automobile such that convenience features may be incorporated into a rear side panel and be accessible to an occupant in the associated end seat. Moreover, some of the second row seats may be adjacent the seat backs of the front row seats such that some convenience features may be incorporated therein and be accessible to the second row occupants immediately behind the seat backs. The middle seat occupant, however, or an occupant adjacent the center console typically has limited access to the rear side panels or front row seat backs thus making it difficult to provide convenience features to that occupant from these areas.

Furthermore, many convenience features incorporated into the rear of the center console for access by the second row occupants have generally not been successful. For instance, the rear of the center console is relatively low and therefore positioned such that it is difficult to access the convenience features from the second row seats. The relatively low height of the console may also cause problems with the viewing screen of the video entertainment system. For example, the low height of the viewing screen may cause some passengers to suffer from motion sickness generated by the improper sight lines of the relatively low-level viewing screen.

There is thus a need for an improved console that provides convenience features to the second row occupants that overcomes these and other disadvantages and shortcomings of present console designs.

SUMMARY OF THE INVENTION

The present invention provides an automotive console that overcomes these and other shortcomings by providing convenience features to second row occupants that are accessible and at an appropriate height. The automotive console includes a console body adapted to be installed in the passenger compartment of a vehicle and includes a storage compartment for storing one or more items. The storage compartment includes an opening therein so that a vehicle occupant may access the storage compartment. The console further includes a console lid having a first lid portion pivotally coupled with the console body and movable relative thereto between an open position wherein the storage compartment is accessible through the opening and a closed position wherein the first lid portion overlies the opening. The console lid further includes a second lid portion pivotally coupled with the first lid portion and movable between a first position and a second position relative to the first lid portion. The second lid portion includes at least one convenience feature adapted for use by a second row occupant when the first lid portion is in the open position and the second lid portion is in the second position.

In an exemplary embodiment of the invention, the console includes an angle limiting mechanism for limiting the angle the first lid portion makes with respect to the console body when in the open position. For instance, the first lid portion may form an angle of approximately 90 degrees with respect to the console body when in the open position. To this end, the angle limiting mechanism includes one of a pin or a slot associated with the first lid portion and the other of the pin or slot associated with the console body. The pin is positioned within the slot and traverses the slot as the first lid portion moves between the open and closed positions. The slot includes a first slot end such that the pin engages the first slot end when the first lid portion is in the open position. In this way, the first lid portion cannot be over rotated with respect to the console body. The slot may also include a second slot end such that the pin engages the second slot end when the first lid portion is in the closed position.

The console may include a biasing member adapted to limit movement of the first lid portion relative to the console body when in the open position. For example, the biasing member may include a spring arm that urges the first lid portion toward the open position when the first lid portion is in the open position. In this way, the biasing member prevents or reduces inadvertent and undesired movement of the first lid portion, such as during normal operation of the vehicle. Another biasing member may also be provided to limit movement of the first lid portion relative to the console body when the first lid portion is in the closed position. The biasing member may include one of a recess or a pin associated with the first lid portion and the other one of the recess or pin associated with the console body. The pin frictionally engages the recess when the first lid portion is in the closed position to provide some resistance to movement of the first lid portion away from the console body. In this way, when the first lid portion is in the closed position, the second lid portion may be moved between the first and second positions without moving the first lid portion relative to the console body. This allows, for example, a vehicle occupant to access the storage compartment by only moving the second lid portion and leaving the first lid portion undisturbed.

In an exemplary embodiment, the console also includes an angle limiting mechanism for limiting the angle the second lid portion makes with respect to the first lid portion when in the second position. For instance, the second lid portion may form an angle of approximately 90 degrees with respect to the first lid portion when in the second position. To this end, the angle limiting mechanism includes one of a pin or a slot associated with the second lid portion and the other of the pin or slot associated with the first lid portion. The pin is positioned within the slot and traverses the slot as the second lid portion moves between the first and second positions. The slot includes a first slot end such that the pin engages the first slot end when the second lid portion is in the second position. In this way, the second lid portion cannot be over rotated with respect to the first lid portion. The slot may also include a second slot end such that the pin engages the second slot end when the second lid portion is in the first position.

The console may include a biasing member adapted to limit movement of the second lid portion relative to the first lid portion when in the second position. For example, the biasing member may include a spring arm that urges the second lid portion toward the second position when the second lid portion is in the second position. In this way, the biasing member prevents or reduces inadvertent and undesired movement of the second lid portion relative to the first lid portion, such as during normal operation of the vehicle. A locking mechanism may also be provided to prevent movement of the second lid portion relative to the console body when the first lid portion is in the closed position and the second lid portion is in the first position. For example, the locking mechanism may be a releasable latch. In this way, the second lid portion is selectively and securely fastened with the console body to prevent items within the storage compartment from being ejected into the passenger compartment in the event of a collision.

Advantageously, when the first lid portion is in the open position and the second lid portion is in the second position, the second lid portion is at a height that may be readily accessed by vehicle occupants in the second row seating. As such, the console, and more particularly, the console lid having the above construction may be used to provide various convenience features to the second row occupants. In an exemplary embodiment, the second lid portion includes a generally planar surface operative as a working surface to a second row occupant when the first lid portion is in the open position and the second lid portion is in the second position. Moreover, the planar surface may include a first platform pivotally coupled thereto and movable between a folded position wherein the first platform overlies the planar surface and an extended position wherein the first platform projects away from the planar surface so as to define a larger working surface. The planar surface may further include a second platform pivotally coupled thereto and likewise movable between a folded position overlying the planar surface and an extended position extending away from the planar surface to define a larger working surface. For instance, the first and second platforms may extend away from the planar surface in opposed directions to define a larger working surface.

The second lid portion may include other convenience features that are readily accessible to the second row occupants. For instance, the second lid portion may include a cup holder and/or a storage bin. In another aspect of the invention, the second lid portion may include a viewing screen incorporated therein as part of the vehicle video entertainment system. In an advantageous aspect of the invention, the viewing screen is positioned at an increased height with respect to the console body which raises the sight lines of the occupants in the rear passenger compartment thereby reducing the likelihood of motion sickness.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain certain embodiments of the invention.

DETAILED DESCRIPTION OF THE DRAWINGS

Figure 1:
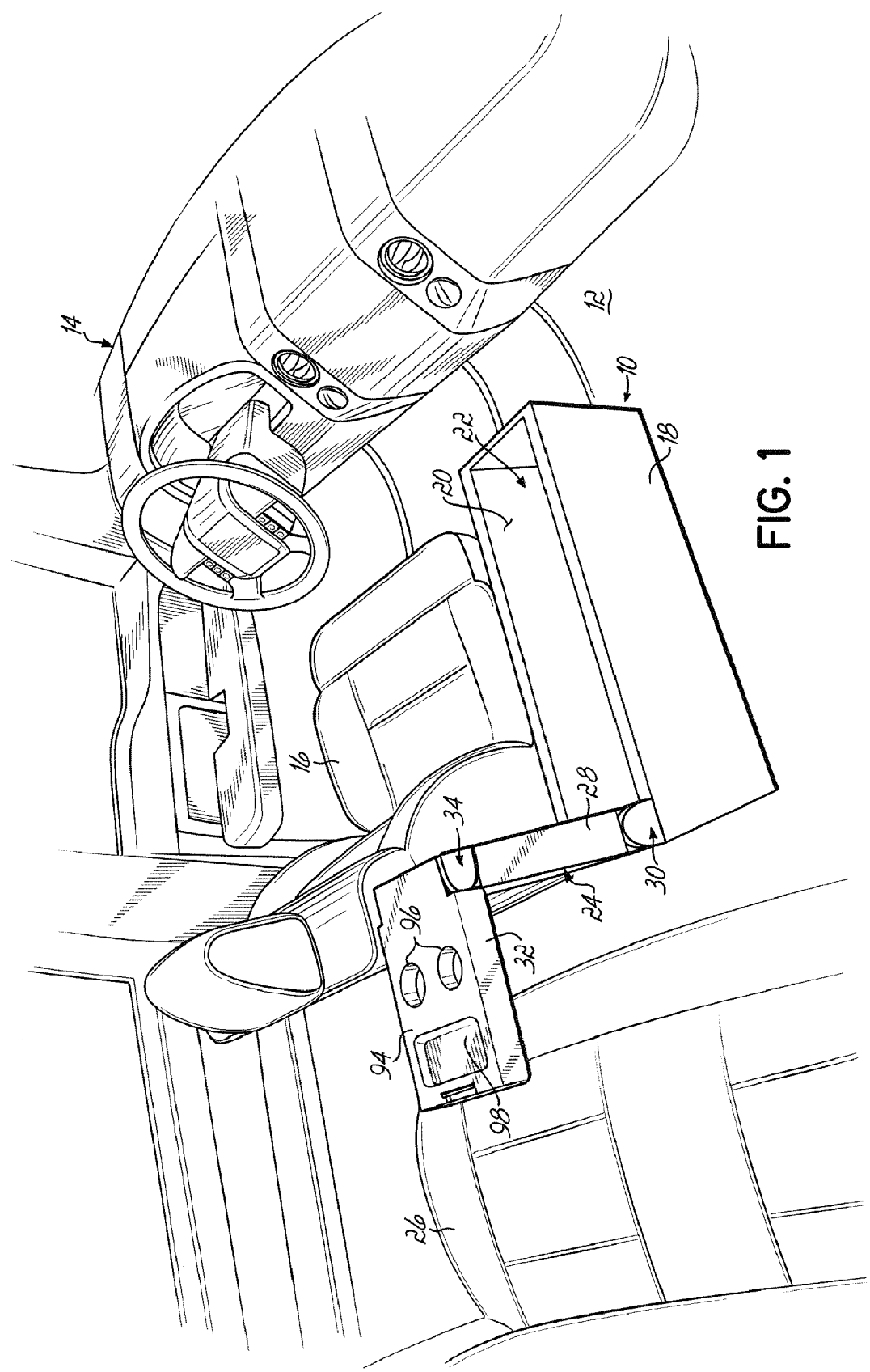
FIG. 1 is a perspective view of an automotive interior having a console in accordance with the invention.

With reference to FIG. 1, an automotive console 10 is positioned in the passenger compartment 12 of a vehicle 14 typically between a pair of front row seats 16 (only one shown). The console 10 includes a console body 18 typically coupled to the floor of the passenger compartment 12 by suitable fasteners as is known in the art. The console body 18 includes a storage compartment 20 formed therein and adapted to store one or more items. The storage compartment 20 includes an opening 22 so that a vehicle occupant may readily access the items in storage compartment 20. As discussed in more detail below, the console 10 further includes a console lid 24 that may be used to provide various convenience features to occupants in the second row seating 26. The console lid 24 advantageously provides the convenience features to the occupants in the second row seating 26 at an increased height with respect to the console body 18 and at a height that may be readily and more conveniently accessed by the second row occupants.

Figure 2:
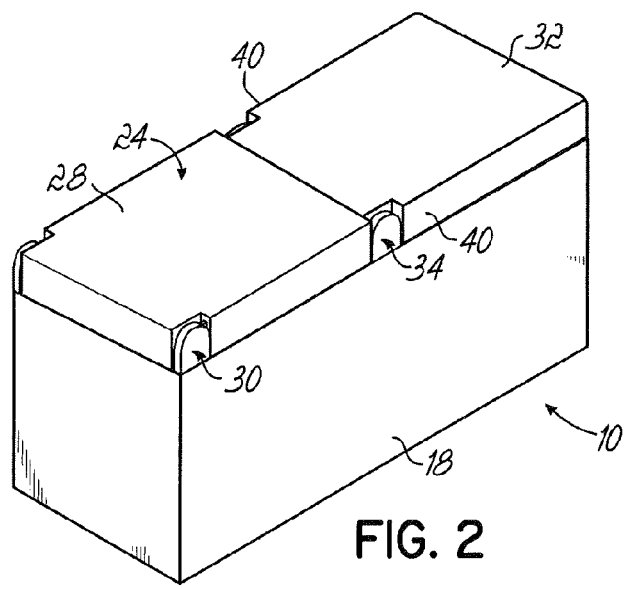
FIG. 2 is a perspective view of the console shown in FIG. 1.

To this end, and as shown in FIGS. 1 and 2, the console lid 24 has a double-hinged construction defining a first lid portion 28 pivotally coupled with the console body 18 by hinge assembly 30 and a second lid portion 32 pivotally coupled with the first lid portion 28 by another hinge assembly 34. The first lid portion 28 is movable relative to console body 18 between an open and closed position. In the open position, as shown in FIG. 1, the first lid portion 28 is moved away from the console body 18 so that a vehicle occupant may access the items in storage compartment 20 through opening 22. In the closed position, as shown in FIG. 2, the first lid portion 28 overlies at least a portion of the opening 22 of storage compartment 20. In a similar manner, the second lid portion 32 is movable relative to the first lid portion 28 between a first position, as shown in FIG. 2, and a second position, as shown in FIG. 1. As shown in FIG. 2, when the first lid portion 28 is in the closed position and the second lid portion 32 is in the first position, the opening 22 to storage compartment 20 is completely covered by console lid 24. In an advantageous aspect of the invention, and as shown in FIG. 1, when the first lid portion 28 is in the open position and the second lid portion 32 is in the second position, the second lid portion 32 is located adjacent the second row seating 26 and is at an increased height with respect to console body 18 and thus readily accessible to occupants in the second row seating 26.

Figure 3:
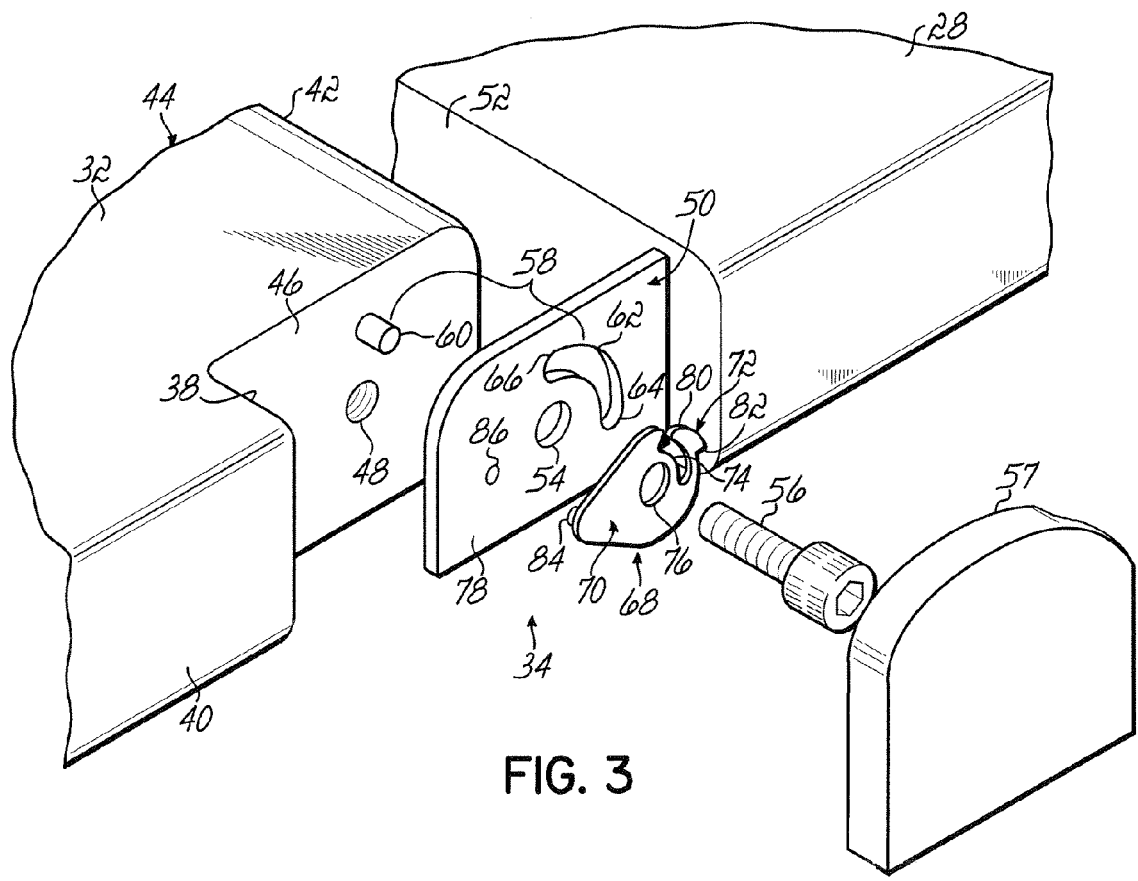
FIG. 3 is a disassembled perspective view of a hinge assembly in accordance with the invention including an angle limiting mechanism and a biasing member.

The pivotal movement of the first and second lid portions 28, 32 is provided by hinge assemblies 30, 34 respectively. In an exemplary embodiment, hinge assemblies 30, 34 are similar in structure and operation and therefore a description of hinge assembly 34 will suffice as an adequate description of hinge assembly 30. The invention, however, is not so limited as hinge assemblies 30, 34 may have different configurations and still be within the scope of the invention. As shown in FIG. 3 for hinge assembly 34, second lid portion 32 includes a cutout 38 along the opposed side edges 40 of second lid portion 32 and adjacent an edge 42 abutting the first lid portion 28 to define a first connecting member 44. The side edges 46 of the connecting member 44 include therein a threaded hole or aperture 48. Additionally, the first lid portion 28 further includes a pair of second connecting members 50 projecting from an edge 52 abutting the second lid portion 32. The connecting members 50 are spaced apart on edge 52 by a width approximately equal to the width of first connecting member 44. Each of the connecting members 50 includes an aperture 54 adapted to align with the threaded aperture 48 in the second lid portion 32. A threaded hinge pin 56 is inserted through aperture 54 and threadingly engages aperture 48 to couple the first and second lid portions 28, 32. The aperture 54 is suitably sized so that the hinge pin 56 may freely rotate relative to aperture 54 and therefore allows the second lid portion 32 to rotate relative to the first lid portion 28. A cap or cover 57 may be provided to conceal the internal components of hinge assembly 34 and provide a more aesthetically pleasing appearance. It should be recognized that the invention is not limited to hinge assemblies having the above construction, as those of ordinary skill in the art will recognize other hinged configurations that may also be used in the invention.

To limit the pivotal movement of the first lid portion 28 relative to the console body 18 and to limit the pivotal movement of the second lid portion 32 relative to the first lid portion 28, each of the hinge assemblies 30, 34 includes an angle limiting mechanism 58. Again, the angle limiting mechanism 58 for each of the hinge assemblies 30, 34 are substantially similar thus a description of one will suffice as an adequate description of the other. In an exemplary embodiment, and as shown in FIG. 3, the angle limiting mechanism 58 includes a pin 60 projecting away from at least one of the side edges 46 in first connecting member 44 and spaced from threaded aperture 48. The angle limiting mechanism 58 further includes an arcuate slot 62 formed in at least one corresponding second connecting member 50 and spaced from aperture 54. Those of ordinary skill in the art should recognize that the pin 60 may be formed with the second connecting member 50 and the slot 62 may be formed with the first connecting member 44. The pin 60 and slot 62 are configured such that as hinge assembly 34 is being assembled, pin 60 is positioned within slot 62 and traverses slot 62 as the second lid portion 32 is moved between the first and second positions. The slot 62 includes a first slot end 64 such that when the second lid portion 32 is in the second position, the pin 60 engages first slot end 64 thereby preventing any further rotation of second lid portion 32 relative to first lid portion 28. For example, in the exemplary embodiment, the second lid portion 32 forms an angle of approximately 90 degrees with respect to the first lid portion 28 when in the second position. Slot 62 may also include a second slot end 66 such that the pin 60 may engage the second slot end 66 when the second lid portion 32 is in the first position.

As mentioned above, the angle limiting mechanism 58 in hinge assembly 30 is similar to that described above for hinge assembly 34. In particular, the angle limiting mechanism 58 limits the angle the first lid portion 28 makes with the console body 18. For instance, in an exemplary embodiment, the first lid portion 28 may be substantially upright when in the open position. To this end, for example, the first lid portion 28 may form an angle of approximately 90 degrees with respect to the console body 18 when in the open position. The angle limiting mechanism 58 in the hinge assemblies 30, 34 prevents the first and second lid portions 28, 32 from over rotating so that when the first lid portion 28 is in the open position and the second lid portion 32 is in the second position, the console lid 24 has an inverted L shape with respect to the console body 18, such as that shown in FIG. 1. When in such a position, the first lid portion 28 is oriented in a substantially upright direction and the second lid portion 32 is oriented in a substantially horizontal direction. The invention is not limited to the angle limiting mechanism as described herein. Those of ordinary skill in the art will recognize other angle limiting mechanisms that may also be used to limit the pivotal movement of the first and second lid portions 28, 32.

Whether the console lid 24 is being used to overlie the opening 22 in storage compartment 20, as shown in FIG. 2, or the console lid 24 is being used to provide convenience features to the occupants in the second row seating 26, as shown in FIG. 1, it is desirable to limit or prevent movement of the console lid 24 during, for example, normal operation of the vehicle or during a collision. For example, when the console lid 24 overlies the opening 22 in storage compartment 20, it is desirable that the console lid 24 be secured to the console body 18 so that the various items in storage compartment 20 are not ejected into the passenger compartment 12 in the event of a collision. Moreover, when the console lid 24 is being used to provide convenience features to the second row occupants, the console lid 24 must be a relatively stable structure such that the console lid 24 does not collapse or otherwise undesirably move during normal operation of the vehicle. For example, it would be undesirable for the first lid portion 28 to move toward the closed position during rapid deceleration or when hitting a speed bump, pot hole, or other minor obstructions in the road.

Accordingly, the console 10 may include one or more biasing members or locking mechanisms to limit or prevent movement of the first and second lid portions 28, 32. To this end, and in an exemplary embodiment, the hinge assemblies 30, 34 may each include a biasing member 68 that respectively biases the first lid portion 28 toward the open position when the first lid portion 28 is in the open position and biases the second lid portion 32 toward the second position when the second lid portion 32 is in the second position. The structure and operation of the biasing members 68 for the hinge assemblies 30, 34 are similar. Thus, a description of the biasing member 68 for hinge mechanism 34 will suffice as an adequate description of the biasing member for hinge mechanism 30.

Figure 4:
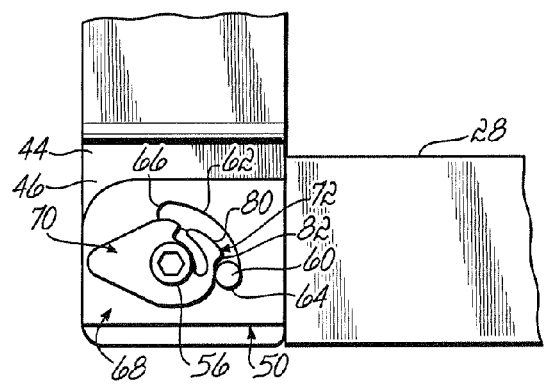
FIG. 4 is a side elevation view of the hinge assembly of FIG. 3 with the second lid portion in the second position and being biased by the biasing member.

As shown in FIGS. 3 and 4, the biasing member 68 includes a main body portion 70 and a resilient spring arm 72 coupled with the main body portion 70 at one end thereof and separated from the main body portion 70 by a gap 74 along a remainder of the spring arm 72. The main body portion 70 includes an aperture 76 adapted to receive the threaded hinge pin 56 therein when mounted to an outer surface 78 of second connecting member 50. The spring arm 72 includes an enlarged head 80 having an arcuate outer edge portion and further defining a notch 82 therein. The biasing member 68 is sized such that when the aperture 76 is aligned with the aperture 54 in the second connecting member 50, at least a portion of the spring arm 72 projects into the slot 62 adjacent the first slot end 64. To prevent the biasing member 68 from rotating relative to the second connecting member 50, the biasing member 68 further includes a detent 84 that engages a recess 86 in the second connecting member 50 when mounted thereto, such as by engaging hinge pin 56 with threaded aperture 48. In this way, the spring arm 72 is properly and fixedly positioned with respect to slot 62.

In operation, as the second lid portion 32 is moved toward the second position, the pin 60 moves along slot 62 and eventually engages the spring arm 72. As the second lid portion 32 continues to move toward the second position, i.e., toward the first slot end 64, the pin 60 engages the arcuate outer edge portion of head 80 which deforms the spring arm 72 toward the main body portion 70 until the pin 60 engages notch 82 at which point the spring arm 72 moves or snaps back out away from the main body portion 70. In the second position, the pin 60 is bounded on one side by the first slot end 64 and bounded on the other side by the notch 82 of spring arm 72. The spring arm 72 then biases the second lid portion 32 toward the second position when the second lid portion 32 is in the second position thus preventing or reducing inadvertent movement of the second lid portion 32 away from the second position. To move the second lid portion 32 away from the second position, a sufficient force must be applied so as to deform the spring arm 72 back toward the main body portion 70 thereby allowing the pin 60 to overcome notch 82 and move back along slot 62 toward the second slot end 66.

As mentioned above, the biasing member 68 in hinge assembly 30 is similar to that described above for hinge assembly 34. In particular, the biasing member 68 biases the first lid portion 28 toward the open position when the first lid portion 28 is in the open position to prevent or reduce inadvertent movement of the first lid portion 28 away from the open position. The first lid portion 28 may be moved to the closed position by applying a sufficiently large force to overcome the force of the biasing member as described above. The invention is not limited to the particular biasing member 68 as described herein. Those of ordinary skill in the art will recognize other biasing members that may also be used to bias the first and second lid portions 28, 32 toward the open and second positions respectively.

Figure 5:
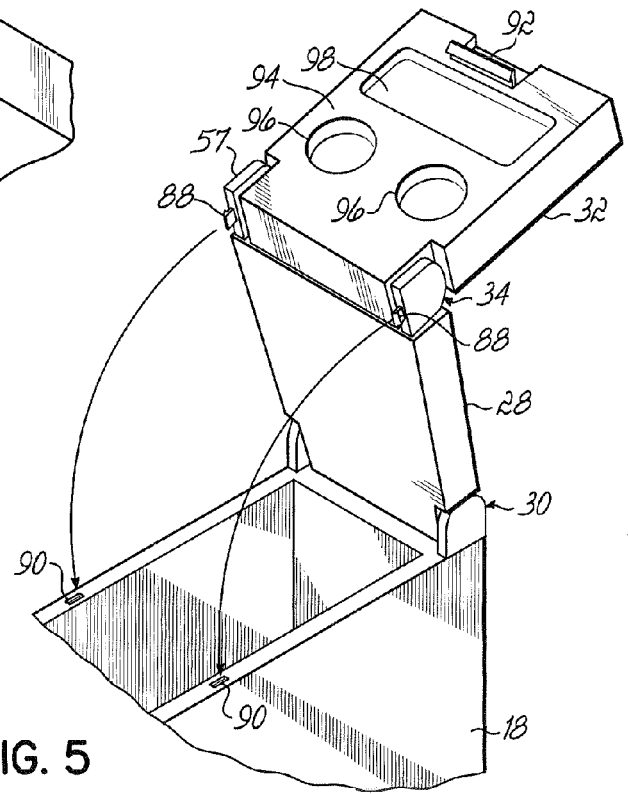
FIG. 5 is a perspective view showing a biasing member for biasing the first lid portion in the closed position.

As discussed above, it may also be desirable to bias the first lid portion 28 in the closed position when the first lid portion 28 is in the closed position. To this end and as shown in FIG. 5, the first lid portion 28 may include at least one latch pin 88 and console body 18 may include at least one recess 90 wherein the latch pin 88 frictionally engages the recess 90 when the first lid portion 28 is in the closed position. The latch pin 88 may be incorporated into the cover 57 as shown or may be coupled with first lid portion 28 at other locations, as recognized by those of ordinary skill in the art. The frictional engagement between the latch pin 88 and recess 90 biases the first lid portion 28 toward the closed position such that a sufficient force must be applied to move the first lid portion 28 away from console body 18 and toward the open position. Biasing the first lid portion 28 toward the closed position when in the closed position not only prevents or reduces inadvertent movement of the first lid portion 28, but also allows the second lid portion 32 to be moved to the second position independently of the first lid portion 28, i.e., without moving first lid portion 28. This advantageously allows a vehicle occupant to access at least the front part of the storage compartment 20 by only moving the second lid portion 32.

Figure 6:
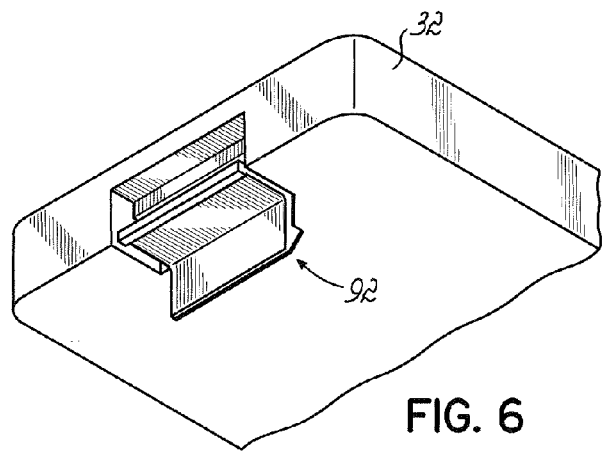
FIG. 6 is a partial perspective view of a locking mechanism for secure the second lid portion with the console body.

It may also be desirable to secure the second lid portion 32 to the console body 18 when the first lid portion 28 is in the closed position and the second lid portion 32 is in the first position. To this end, the console 10 may include a locking mechanism for securing the console lid 24 with the console body 18. For example, in the exemplary embodiment and as shown in FIG. 6, the second lid portion 32 may include a releasable hook 92 that cooperates with a complimentary connecting member (not shown) on the console body 18 as is known in the art. The releasable hook 92 is adapted to prevent movement of the second lid portion 32 relative to the console body 18 until the hook 92 is actuated by a vehicle occupant. In this way, the console lid 24, including the first and second lid portions 28, 32, remain secured to the console body 18 and prevents items inside storage compartment 20 from being ejected into the passenger compartment 12 in the event of a collision.

In an advantageous aspect of the invention, when the first lid portion 28 is in the open position and the second lid portion 32 is in the second position, the second lid portion 32 is located adjacent the second row seating 26 and is at an increased height relative to the console body 18 that may be readily accessed by the second row occupants (FIG. 1). Consequently, the second lid portion 32 may be used to provide various convenience features to the second row occupants that has heretofore proven challenging. Convenience features are generally any features added to the interior of the vehicle to provide some convenience or comfort to the vehicle occupants. Convenience features include, but are not limited to, cup holders, coin compartments, storage bins, working surfaces, ashtrays, viewing screens, etc.

For instance, as shown in FIGS. 1 and 5, in one embodiment of the invention, when the first lid portion 28 is in the open position and the second lid portion 32 is in the second position, the second lid portion 32 includes a generally planar surface that operates as a general working surface 94 for the second row occupants. The working surface 94 may be used for a wide range of activities for the second row occupants including, but not limited to, reading, writing, eating, playing games, etc. Other convenience features may also be provided either alone or in combination with the working surface 94. As further shown in FIGS. 1 and 5, one or more cup holders 96 may be provided in the working surface 94. The cup holders 96 support cups, cans and other beverage containers and prevent spillage of their contents during normal operation of the vehicle. The working surface 94 may also include a general storage bin 98 which may be used to temporarily store various items, such as coins, keys, tissue, cell phones, etc., but yet be readily accessible to the second row occupants. Those of ordinary skill in the art will recognize other convenience features that may be provided to the second row occupants either alone or in combination with the above noted convenience features.

Figure 7:
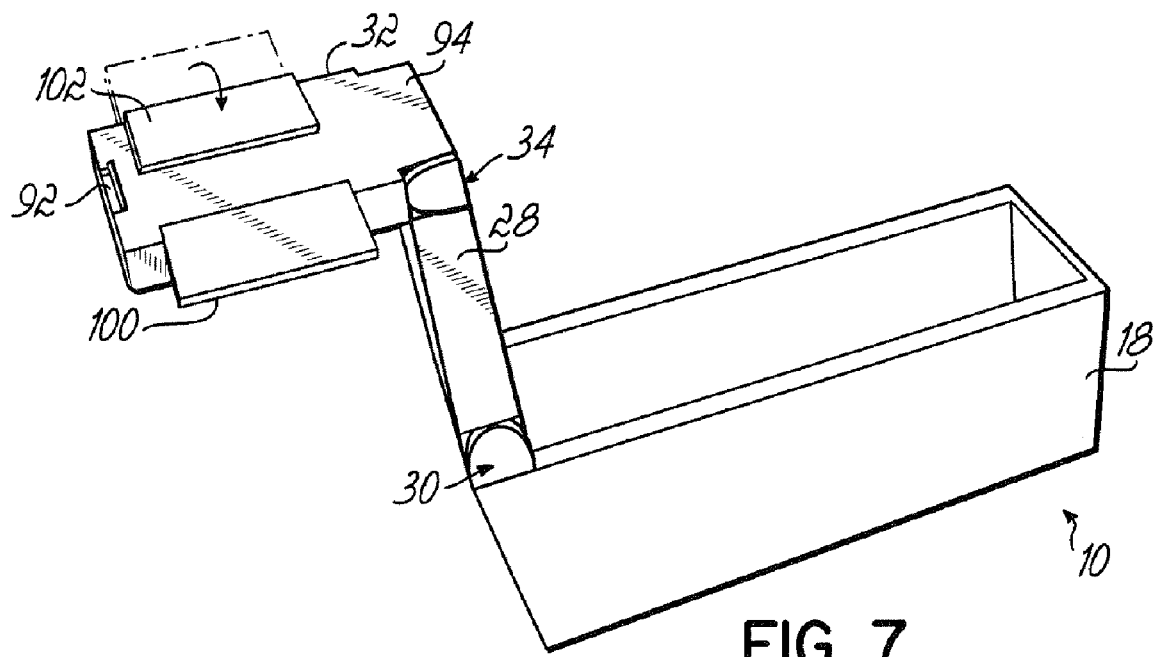
FIG. 7 is a perspective view of an embodiment of the console having foldable platforms for increasing the size of the working surface.

In another embodiment of the invention, the working surface 94 may include trays or platforms that increase the size of the working surface 94. As shown in FIG. 7, the working surface 94 may include first and second platforms 100, 102 that are pivotally coupled with the working surface 94. The platforms 100 and 102 are movable between a folded position, as shown by platform 102 and an extended position, as shown by platform 100. In the folded position, the platforms 100, 102 overlie the working surface 94 and are contained within the periphery of the working surface 94. In the extended position, the platforms 100, 102 project away from the working surface 94, such as in opposed directions, so as to define a larger working surface. The enlarged working surface may be used to support larger items. For example, the enlarged working surface may be used to support a laptop computer, a viewing screen, video games, etc. The platforms 100, 102 may also include other convenience features, such as cup holders 96, etc.

Figure 8:
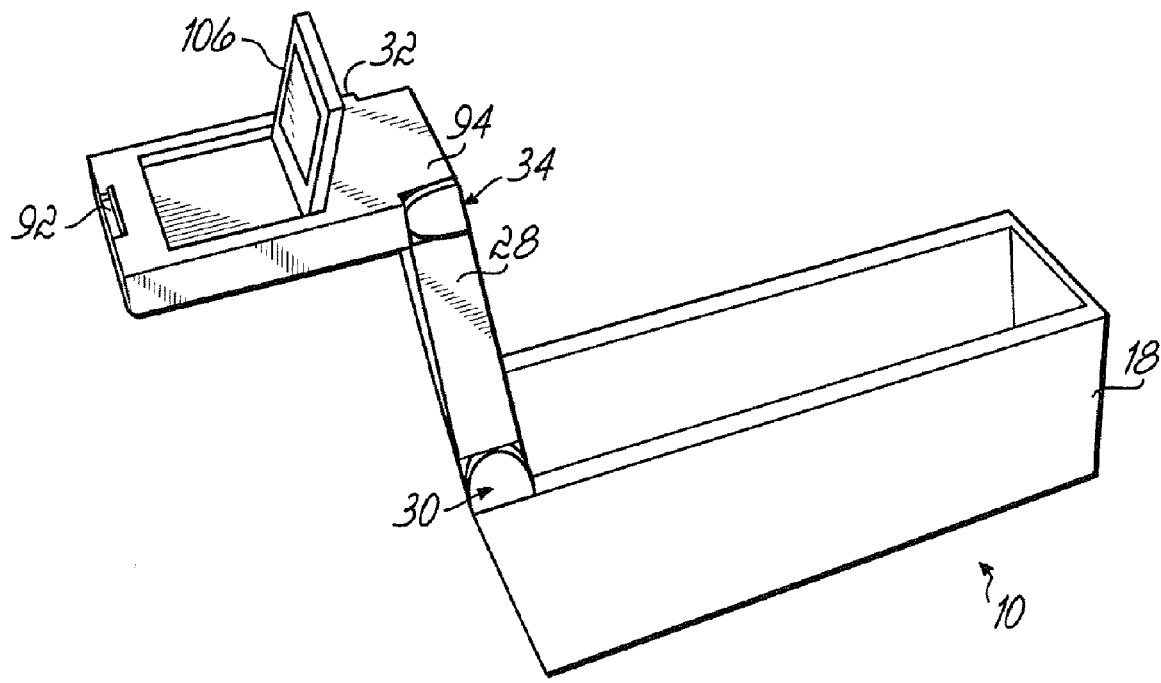
FIG. 8 is a perspective view of another embodiment of the console having a pivotable viewing screen incorporated into the second lid portion.

In still another embodiment of the invention, and as shown in FIG. 8, the second lid portion 32 may include a viewing screen 106 incorporated therein and movable between an open position wherein the viewing screen 106 is viewable by occupants in the second row seating 26 and a closed position wherein the viewing screen 106 is encased within the second lid portion 32. The viewing screen 106 may be coupled with a video entertainment system (e.g. DVD player) by suitable cables (not shown) as is known in the art. As shown in FIG. 8, in an advantageous aspect of the invention, the particular double-hinged construction of the console lid 24 allows the viewing screen 106 to be positioned at an increased height in relation to the console body 18, where many previous viewing screens are positioned. Increasing the height of the viewing screen 106 thus increases the sight lines of the occupants watching the screen 106, which in turn reduces the risks of those occupants suffering motion sickness.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. An automotive console for use with a passenger compartment of a vehicle, comprising:
    a console body adapted to be installed in the passenger compartment and including a storage compartment for storing one or more items, said storage compartment having an opening for accessing the items in said storage compartment; and
    a console lid, comprising:
        a first lid portion pivotally coupled with said console body and moveable relative to said console body between an open position wherein said storage compartment is accessible through said opening and a closed position wherein said first lid portion overlies said opening; and
        a second lid portion pivotally coupled with said first lid portion along an edge, said second lid portion rotatable relative to said first lid portion about an axis substantially parallel to said edge between a first position and a second position, said second lid portion including at least one convenience feature adapted for use by a second row vehicle occupant when said first lid portion is in the open position and said second lid portion is in the second position.

2. The automotive console of claim 1, further comprising:
    an angle limiting mechanism for limiting an angle said first lid portion makes with respect to said console body when in the open position.

3. The automotive console of claim 2, wherein said first lid portion forms the angle of approximately 90 degrees with respect to said console body when in the open position.

4. The automotive console of claim 2, wherein said angle limiting mechanism comprises:
    one of a slot and a pin associated with said first lid portion and the other one of said slot and said pin associated with said console body, said pin positioned within said slot and traversing said slot as said first lid portion is moved between the open and closed positions, said slot including a first slot end wherein said pin engages said first slot end when said first lid portion is in the open position.

5. The automotive console of claim 1, further comprising:
    a biasing member adapted to limit movement of said first lid portion relative to said console body when in the open position.

6. The automotive console of claim 1, further comprising:
    a biasing member adapted to limit movement of said first lid portion relative to said console body when in the closed position.

7. The automotive console of claim 6, wherein said biasing member comprises:
    one of a recess and a pin associated with said first lid portion and the other one of said recess and said pin associated with said console body, said pin frictionally engaging said recess when in the closed position.

8. The automotive console of claim 1, further comprising:
    an angle limiting mechanism for limiting the angle said second lid portion makes with respect to said first lid portion when in the second position.

9. The automotive console of claim 8, wherein said second lid portion forms an angle of approximately 90 degrees with respect to said first lid portion when in the second position.

10. The automotive console of claim 8, wherein said angle limiting mechanism comprises:
    one of a slot and a pin associated with said second lid portion and the other one of said slot and said pin associated with said first lid portion, said pin positioned within said slot and traversing said slot as said second lid portion is moved between the first and second positions, said slot including a first slot end wherein said pin engages said first slot end when said second lid portion is in the second position.

11. The automotive console of claim 1, further comprising:
a biasing member adapted to limit movement of said second lid portion relative to said first lid portion when in the second position.

12. The automotive console of claim 1, further comprising:
a locking mechanism adapted to prevent movement of said second lid portion relative to said console body when said first lid portion is in the closed position and said second lid portion is in the first position.

13. The automotive console of claim 12, wherein said locking mechanism is a releasable latch.

14. The automotive console of claim 1, wherein said convenience feature includes a generally planar surface operative as a working surface to the second row occupant when said first lid portion is in the open position and said second lid portion is in the second position.

15. The automotive console of claim 14, wherein said generally planar surface further comprises:
a first platform pivotally coupled to said planar surface and moveable between a folded position wherein said first platform overlies said planar surface and an extended position wherein said first platform projects away from said planar surface so as to define a larger working surface.

16. The automotive console of claim 15, wherein said generally planar surface further comprises:
a second platform pivotally coupled to said planar surface and moveable between a folded position wherein said second platform overlies said planar surface and an extended position wherein said second platform projects away from said planar surface so as to define a larger working surface.

17. The automotive console of claim 1, wherein said convenience feature includes a cup holder.

18. The automotive console of claim 1, wherein said convenience feature includes a viewing screen incorporated within said second lid portion and pivotally coupled thereto so as to be moveable between an open position wherein said viewing screen is viewable and a closed position wherein said viewing screen is encased within said second lid portion.

19. An automotive console for use with a passenger compartment of a vehicle, comprising:
a console body adapted to be installed in the passenger compartment and including a storage compartment for storing one or more items, said storage compartment having an opening for accessing the items in said storage compartment; and
a console lid, comprising:
a first lid portion pivotally coupled with said console body and moveable relative to said console body between an open position wherein said first lid portion is oriented in a substantially upright direction and a closed position wherein said first lid portion overlies a first portion of said opening; and
a second lid portion pivotally coupled with said first lid portion and moveable between a first position and a second position relative to said first lid portion, wherein said second lid portion is oriented in a substantially horizontal direction when said first lid portion is in the open position and said second lid portion is in the second position, and wherein said second lid portion overlies a second portion of said opening different from said first portion of said opening when said first lid portion is in the closed position and said second lid portion is in the first position;
said second lid portion including at least one convenience feature adapted for use by a second row occupant when said first lid portion is in the open position and said second lid portion is in the second position.

20. An automotive console for use with a passenger compartment of a vehicle, comprising:
a console body adapted to be installed in the passenger compartment;
a console lid having a first lid portion pivotally coupled with said console body at one end of said first lid portion and a second lid portion pivotally coupled with said first lid portion at an opposed end of said first lid portion, said first lid portion moveable to a position oriented in a substantially upright direction, said second lid portion moveable to a position oriented in a substantially horizontal direction when said first lid portion is oriented in the substantially upright direction; and
at least one convenience feature associated with said second lid portion and adapted to be provided to a second row vehicle occupant at an increased height with respect to said console body when said first lid portion is oriented in the substantially vertical direction.

* * * * *